Feb. 7, 1928.
H. W. EASTMAN
1,658,328
REENFORCED TAG AND ROTARY PROCESS FOR MAKING SAME
Filed March 26, 1927
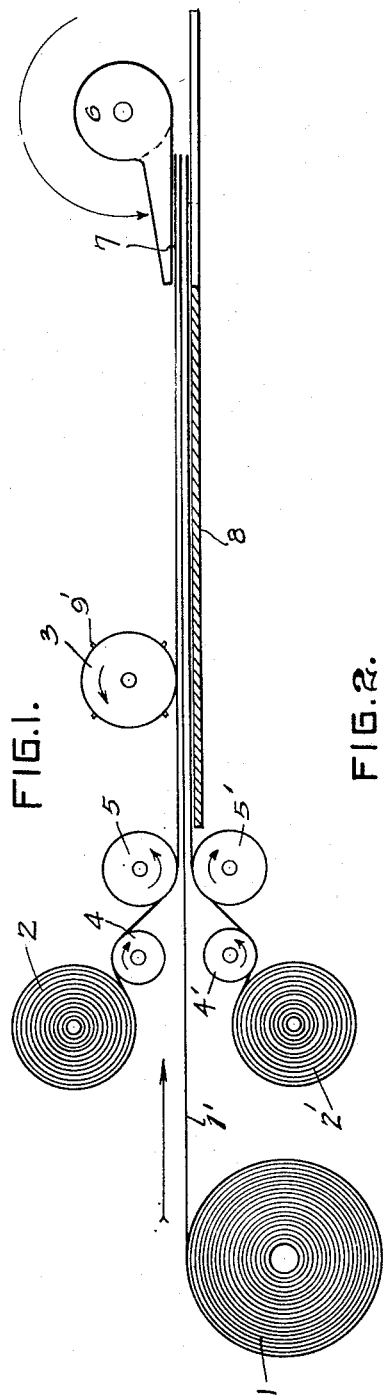
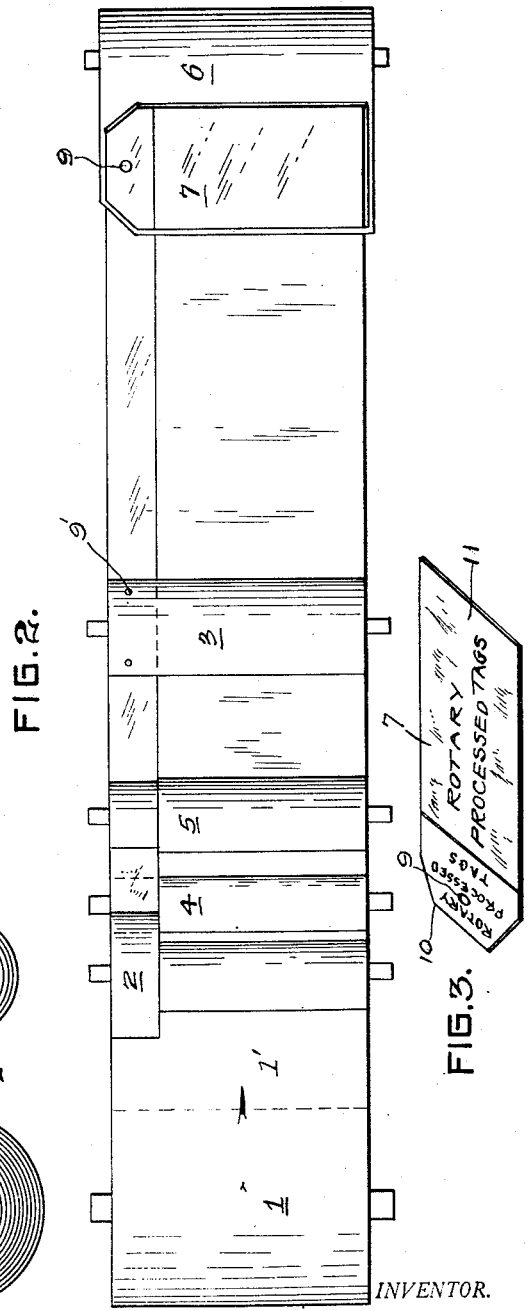
INVENTOR.
HOWARD W. EASTMAN.
BY
ATTORNEYS.

Patented Feb. 7, 1928.

1,658,328

UNITED STATES PATENT OFFICE.

HOWARD W. EASTMAN, OF SAN FRANCISCO, CALIFORNIA.

REENFORCED TAG AND ROTARY PROCESS FOR MAKING SAME.

Application filed March 26, 1927. Serial No. 178,619.

The present invention relates to improvements in reenforced tags and processes for making same, and has for its primary object the provision of means for taking from rolls both the material for the tag body and the material for reenforcing both above and below the tag end, adhesively preparing the inner faces of the reenforcing material, running the body and margin thus secured between pressure rollers, thence beneath a rotary punch, and thence to a rotary cutter, wherethrough the reenforced corners are trimmed and the tag severed simultaneously from the main body.

An additional object of the invention is the provision of a continuous process for the production of an entire end-reenforced tag, both the upper and lower surface of which carry throughout the full tag width reenforcing material, and bearing a punched eyelet opening centrally through the thus reenforced section, this section being adapted to serve, also, as a stub for the main body of the tag, where it is desired that it carry information that may require its detachment.

A further object is the employment of a process in tag manufacture of a continuous rotary character from inception to completion, in contradistinction to that of the intermittent as at present employed, a process greatly facilitating and increasing production, cheapening the cost, and yielding a more strongly reenforced and satisfactory product through having the eyelet-bearing tag-end reenforced on both sides throughout its entire width.

In the accompanying drawings, forming a part of this specification, and in which similar characters of reference refer to like parts, throughout:

Figure 1 is a side elevation diagrammatically illustrated, showing the process as a continuous rotary one, including both the roll from which the tag bodies are formed and the upper and lower reenforcing ribbon rolls, the glue-coating features for the reenforcing elements, the pressure rolls, the table, the rotary perforator, and the revoluble trimmer and cutter;

Figure 2 is a plan view illustrative of the arrangement and relation of parts and elements, as previously designated in Figure 1;

And Figure 3 is an isometric view of a finished tag, showing a completed tag, having a fully reenforced stub portion and a body portion of a character permitting detachment therefrom under conditions requiring it.

Referring more particularly to the drawings, 1 indicates a roll of paper or other material of a quality suitable for tag bodies and 1' a portion of it entering upon the rotary process to be undergone to turn it out as a finished product, 2 and 2' the upper and lower rolls of reenforcing material, 4 and 4' the upper and lower means for supplying the necessary adhesive coating to the inner surfaces of the reenforcing ribbons, 5 and 5' the compression rollers between which the marginal portion of the body and the reenforcing strips pass to receive the necessary compression to insure adhesion, $3^a$ member bearing peripherally the rotary punches 9' for punching centrally through the reenforced end the eyelet through which the tag may be secured to an object, 6 the rotary clipper and cutter, 7 the completed severed and corner-clipped tag, 8 the table for the support of and over which the reenforced tag material passes on its way to the clipper and cutter 6, 9 the punched eyelets, 10 the reenforced stub portion of the tag, and 11 the body portion of the tag and detachable under conditions requiring it.

As is obvious, though not shown, a single roll of reenforcing material may be substituted for the double one employed, running this at right angles to and along the edge of the margin of the material intended to be reenforced, creasing it centrally and longitudinally and guiding it in such manner as to receive the margin to be reenforced between the fold thus secured and continuing the process as previously provided for, the adhesive coating in this instance being applied to the upper and lower surface of the marginal tag area to be reenforced, rather than to the reinforcing material itself. It is equally obvious that both sides of that margin of the tag blank intended to be reenforced may be adhesively treated, thus obviating the necessity of applying this treatment to the reenforcing material.

No attention has been paid to the provision of the gear required for the operation in connected manner of the various elements necessary to the continued and uninterrupted process, inasmuch as the intent is to simply illustrate diagrammatically an uninterrupted process, taking the material from rolls and turning it out as a finished product, through the employment of the simplest mechanical means possible.

Though the rotary cutter 6 is indicated as carrying but a single blade for the severance of the completely reenforced and eyeletted tag from the main body of reenforced material, it is quite apparent that it could be arranged to carry this member as a series of parallel blades.

Having thus described my invention, I claim, and desire to secure by Letters Patent:

1. The step in the process of manufacturing reenforced eyeleted tags which consists in continuously feeding tag blanks from a roll and simultaneously and continuously feeding and securing a reenforcing strip to each side of the edge of the tag blanks to be eyeleted throughout the full width of the blank.

2. The process of manufacturing reenforced eyeleted tags which consists in continuously feeding the tag blanks from a roll, adhesively treating each side of the margin of the blanks, continuously applying to said adhesively treated margin a reenforcing strip throughout the full width of the blank and perforating each blank through its reenforced edge to form an eyelet.

3. The process of manufacturing reenforced eyeleted tags, which consists in continuously feeding tag blanks from a roll, continuously feeding and securing a reenforcing strip to each side of one edge of the tag blanks throughout the full width of the blanks, and perforating each blank through its reenforced edge to form an eyelet.

4. The process of manufacturing reenforced eyeleted tags, which consists in continuously feeding tag blanks from a roll, continuously feeding and securing a reenforcing strip to both sides of one edge of the tag blanks throughout the full width of the strip, perforating each blank through its reenforced edge to form an eyelet and cutting the tag blanks to form separate tags.

5. The process of manufacturing reenforced eyeleted tags, which consists in continuously feeding tag blanks from a roll, continuously feeding and securing a reenforcing strip to each side of one edge of the tag blanks throughout the full width of the blanks, perforating each blank through its reenforced edge to form an eyelet, cutting out sections from a reenforced edge at spaced intervals and severing the tag blank at intervals to form separate tags.

6. The process of manufacturing reenforced eyeleted tags, which consists in continuously feeding tag blanks from a roll, continuously feeding and securing a reenforcing strip to each side of one edge of the tag blanks throughout the full width of the blanks, perforating the blanks at intervals through its reenforced edge, cutting out sections from the reenforced margin at spaced intervals and between the perforations, and severing the tag blanks to form separate tags.

HOWARD W. EASTMAN.